US006347654B1

(12) United States Patent
Koch

(10) Patent No.: US 6,347,654 B1
(45) Date of Patent: Feb. 19, 2002

(54) COMPACT DISK LABELING SYSTEM

(75) Inventor: Richard C. Koch, Margarita, CA (US)

(73) Assignee: Labelwhiz.com, INC, Rancho Santa Margarita, CA (US)

( * ) Notice: Subject to any disclaimer, the term of this patent is extended or adjusted under 35 U.S.C. 154(b) by 0 days.

(21) Appl. No.: 09/507,190

(22) Filed: Feb. 18, 2000

(51) Int. Cl.$^7$ .......................... B32B 31/00; B32B 31/04

(52) U.S. Cl. ....................... 156/391; 156/556; 156/580; 206/308.1

(58) Field of Search ................................ 156/391, 556, 156/579, 580; 206/307, 307.1, 308.1; D6/632

(56) References Cited

U.S. PATENT DOCUMENTS 5,573,120 A * 11/1996 Kaufman et al. ........... 206/755
5,783,033 A * 7/1998 Grossman ................... 156/556
6,273,167 B1 * 8/2001 Miller ........................ 156/391

FOREIGN PATENT DOCUMENTS

AU 670909 * 8/1996

* cited by examiner

*Primary Examiner*—Richard Crispino
*Assistant Examiner*—Sue A Purvis
(74) *Attorney, Agent, or Firm*—Kenneth W. Float

(57) ABSTRACT

A compact disk labeling system for use in applying an adhesive label to a surface of a compact disk. The system comprises a side wall with a shape that substantially matches the exterior shape of the compact disk and which registers the compact disk. A flat shelf is formed a predetermined distance below an upper edge of the side wall that forms an upper cavity. The shelf has a central opening with a plurality of slots extending outward therefrom toward the side wall. A hub is formed on the shelf that comprises a plurality of tabs that extend away from a top surface of the shelf. The hub is sized to allow a central hole in the adhesive label to register thereto. The central opening and slots in the shelf allow the hub to flex.

23 Claims, 2 Drawing Sheets

COMPACT DISK LABELING SYSTEM

BACKGROUND

The present invention relates to compact disk labeling systems for use in applying an adhesive label to a non-readable surface of a compact disk.

A number of patents have been issued relating to compact disk labeling systems for applying compact disk labels. These include U.S. Pat. Nos. 5,421,950, 5,783,033, 5,783,031, 5,902,446, and European Patent No. 0855713.

U.S. Pat. No. 5,421,950 discloses an applicator tool for adhering a gummed label to a circular disk in concentric alignment with a center hole through the disk. The applicator tool has a blade portion and a handle portion. An alignment hub having a raised circular shoulder is disposed on one side of the blade portion and a projecting hub is disposed on the other blade surface. The shoulder and hub are aligned along an axis and the hub and are sized for insertion into the disk center hole.

U.S. Pat. No. 5,783,033 discloses a compact disc labeling device for manually applying a label to a compact disc. The device includes an assembly having a circumferential flange with an upper flange surface, a piston, a first rod having a diameter approximately equal to the diameter of the label's central aperture and that extends from the upper surface of the piston, and a second rod having a diameter approximately equal to the diameter of the disc's central aperture and that extends from the first rod. In use, a label is placed on the flange with the first rod projecting through its central aperture and the disc positioned on the second rod through its central aperture. When the piston is moved from an upper first position to a lower second position, the disc is applied to the label.

U.S. Pat. No. 5,783,031 discloses a device and a process for applying a label to a compact disk. The device is comprised of a two-level base with a post in the center of the base. A compact disc is slipped over the post and rests on the upper level of the base. A cap is then placed over the post which allows an annular paper label to be centered on the disc.

U.S. Pat. No. 5,902,446 discloses a labeler for manually placing self-adhesive labels onto compact disks. The labeler has a positioning cone with an elongated stock member, a flat surface with a diameter greater than that of the elongated stock member, and a point on an end of the positioning cone opposed from the elongated stock member. The labeler also has a positioning plate with a positioning hole in the center, a surface area upon which a self-adhesive label can be placed and a side area to add strength to the positioning plate. The labeler further has a cylindrical base with a flat lip member upon which the positioning plate can rest substantially flat, a flat bottom to keep the cylindrical base substantially flat when used on a substantially flat surface, a wall to keep the flat lip member lifted substantially off of the substantially flat surface and a hollow cavern into which a substantial portion of the positioning cone can fit.

European Patent No. 0855713 discloses a device having a sleeve with a reception element for the compact disc. A fixing element positions the compact disc and a cover element which is pivoted to the reception element and provided with a carrier element for a label on its inside. The carrier element has an adhesive layer for temporarily securing the label and is secured to the inside of the cover element via an adhesion element, with transfer of the label to the surface of the compact disc, upon closure of the sleeve.

The device disclosed in European Patent No. 0855713 has a sticky surface that holds the label prior to contact with the CD. The label is placed by hand around a target circle to locate the label, and the sticky surface holds the label, and then the lid is closed to apply the label to the CD. The is no central hub that holds the label, and there is no concentric foam disk in the device disclosed in European Patent No. 0855713.

Companies by the name of Stomper and Press-it market almost identical label applicators, and these applicators function in a manner similar to the device disclosed in U.S. Pat. No. 5,902,446, although they are made differently. The Stomper and Press-it devices have a base with a surface that holds an adhesive-backed label with the adhesive surface facing upward. A spring loaded central alignment member has a larger diameter lower portion, whose diameter matches that of the label. An upper portion has a smaller diameter that matches the diameter of the opening in the CD. The CD is placed over the upper portion and rests on a shelf (or shoulder region per U.S. Pat. No. 5,902,446) formed between the upper and lower portions of the alignment member. The CD is pressed downward against the tension of the spring, forcing the alignment member downward until the CD contacts the adhesive surface of the label.

Dynosys AG markets a Labelle™ CD labeling system. This system has a bottom casing (or base) containing a centered depressible knob referred to as a movable swimming centering knob. A lid that closes on the bottom casing contains a CD hub and a depressible button that moves the hub and CD towards the bottom casing. A label is placed in the casing bottom, and the movable swimming centering knob automatically aligns with the top centering core when the lid is closed. This aligns the label with the CD. When the lid is closed on the bottom casing and the depressible button in the center of the lid is pressed, the CD-ROM is lowered onto the aligned label disposed in the bottom casing. The movable swimming centering knob in the bottom casing is moved below the label when the depressible button in the center of the lid is pressed to contact the CD with the label.

U.S. patent application Ser. No. 09/409,632 filed Oct. 1, 1999, by the present inventor discloses compact disk labeling systems for use in applying a compact disk label to a compact disk. One embodiment has a compact disk case with a base and a rotatable lid that rotates about a hinge. A central spindle protrudes from a surface of the base that holds the compact disk by means of its central hole. A label hub protrudes from a surface of the lid. A flexible foam disk may be attached to an interior surface of the lid that is disposed around the label hub. Another embodiment includes a base having a generally flat upper surface. A central spindle protrudes slightly above the upper surface of the base that holds the compact disk by means of its central hole. A rotatable lid is attached to the base by means of a hinge and has a generally flat surface with an inner tab section and an outer section that flex relative to each other. A cylindrically-shaped compact disk label hub protrudes from the inner tab section to hold the adhesive label.

It is an objective of the present invention to provide for an improved compact disk labeling system for use in applying an adhesive label to a surface of a compact disk. It is also an objective of the present invention to provide for an improved compact disk labeling system that is fabricated as a single component.

SUMMARY OF THE INVENTION

To accomplish the above and other objectives, the present invention provides for a compact disk labeling system for use in applying an adhesive label to a surface of a compact disk. The compact disk labeling system comprises a side wall having a shape that substantially matches the exterior shape of the compact disk and which registers the compact disk. A flat shelf is formed a predetermined distance below an upper edge of the side wall that forms an upper cavity. The flat shelf has a central opening formed therein with a plurality of slots extending outward therefrom toward the side wall. A hub is formed on the flat shelf that comprises a plurality of tabs that extend away from a top surface of the flat shelf. The hub is sized to allow a central hole in the adhesive label to register thereto. The central opening and slots in the flat shelf allow the hub to flex.

In operation, the adhesive label is placed over the hub with its adhesive side exposed. The compact disk is placed in the cavity and is registered by the side wall. The compact disk is pressed toward the flat shelf which depresses the tabs of the hub so that the compact disk contacts the adhesive side of the adhesive label to attach the adhesive label the compact disk.

BRIEF DESCRIPTION OF THE DRAWINGS

The various features and advantages of the present invention may be more readily understood with reference to the following detailed description taken in conjunction with the accompanying drawing, wherein like reference numerals designate like structural elements and in which.

DETAILED DESCRIPTION

Figure 1:
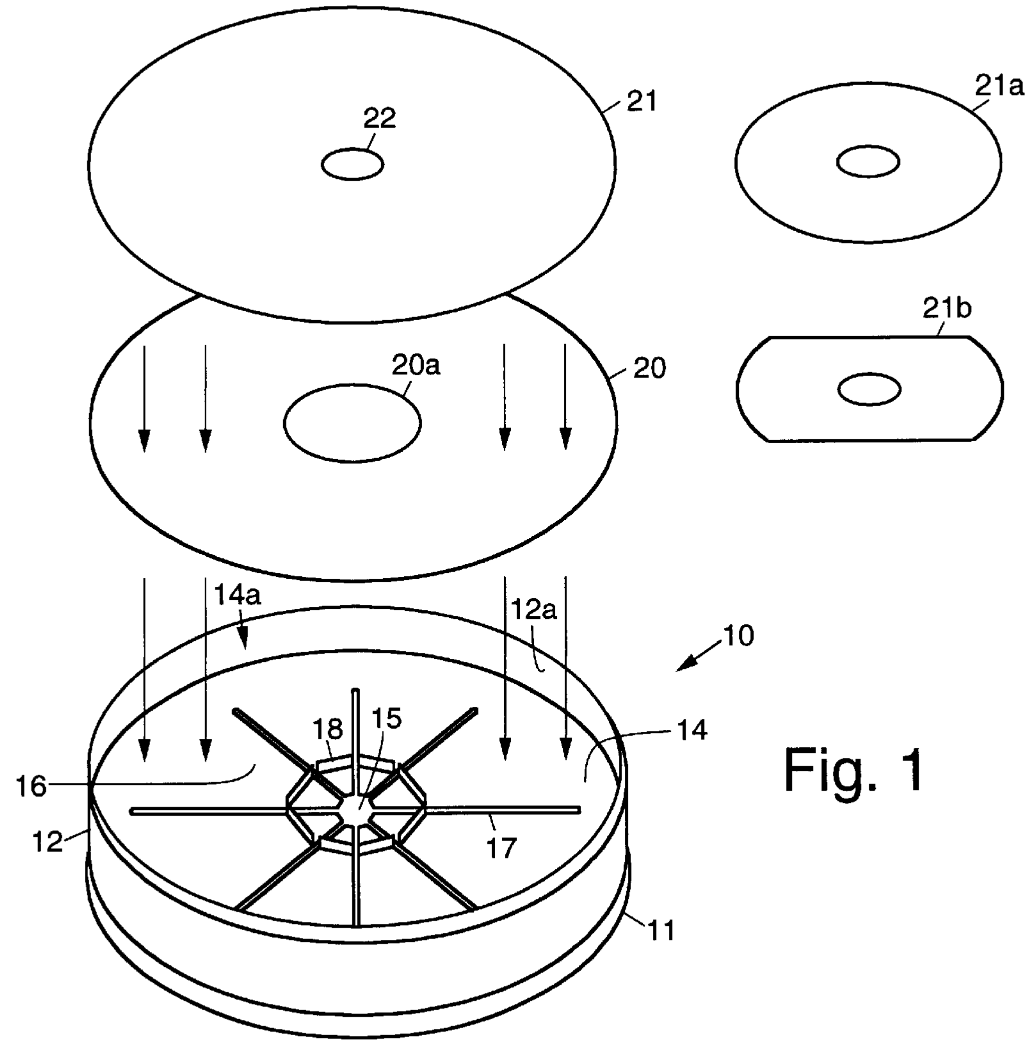
FIG. 1 illustrates an exploded view of an exemplary embodiment of a compact disk labeling system in accordance with the principles of the present invention.
Figure 2:
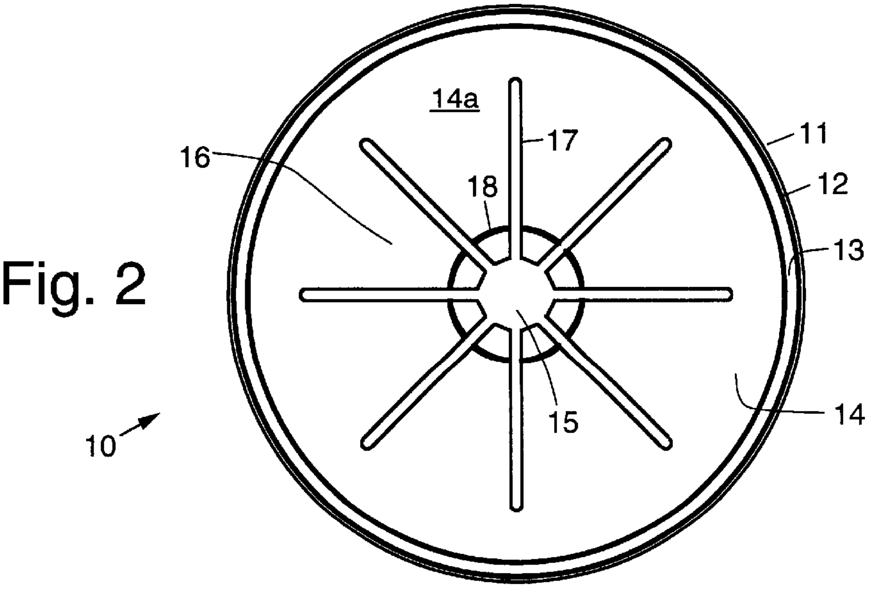
FIG. 2 is a top view of the compact disk labeling system shown in FIG. 1.
Figure 3:
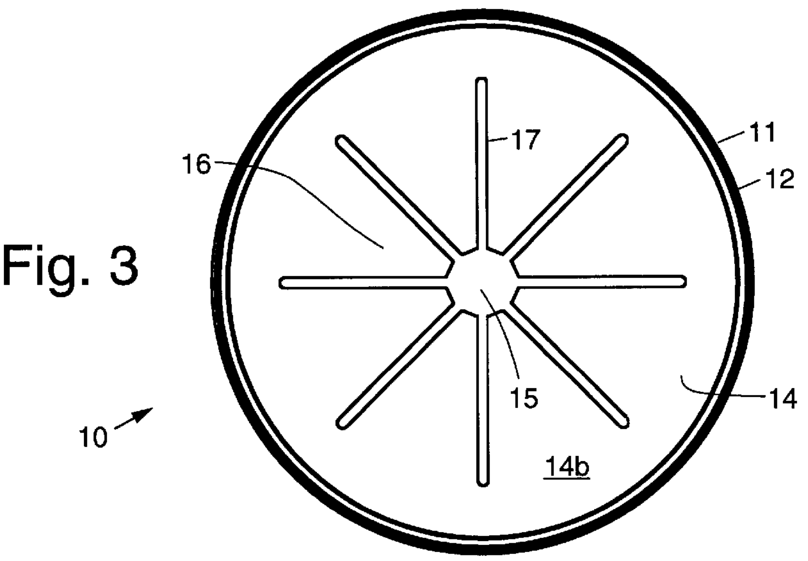
FIG. 3 is a bottom view of the compact disk labeling system shown in FIG. 1.

Referring to the drawing figures, FIG. 1 illustrates an exploded view of an exemplary embodiment of a compact disk labeling system 10 in accordance with the principles of the present invention. FIGS. 2 and 3 show top and bottom views of the compact disk labeling system 10.

FIG. 1 shows the labeling system 10 and a conventional compact disk (CD) 21, recordable CD (CDR), recordable read-writable CD (CDRW), and digital video disk (DVD), and the like, and a CD label 20 that are used with it. Additional types of compact disks 21 known as a mini CD 21*a* and a CD card 21*b* may also be used with the labeling system 10 and are illustrated to the right side of FIG. 1. The CD label 20 has a central hole 20*a* disposed therein. Each of the compact disks 21, 21*a*, 21*b* also have a central opening 22 disposed therein.

With reference to FIGS. 1–3, the compact disk labeling system 10 is preferably a molded as a single-piece plastic component. The exemplary compact disk labeling system 10 is shown as circular in shape. However, the perimeter of the compact disk labeling system 10 may have any shape.

The exemplary compact disk labeling system 10 has a circular outer side wall 12 with a lower edge 11 that contacts a surface on which the labeling system 10 sits. The outer side wall 12 extends away from the lower edge 11 a predetermined distance. A flat shelf 14 is formed a predetermined distance below an upper edge of the outer side wall 12, which forms an upper cavity 14*a*.

A circular inner side wall 12*a* having a diameter that is smaller than the outer side wall 12 and slightly larger than the compact disk 21 extends away from the flat shelf 14 beyond the upper edge of the outer side wall 12. Thus, a groove 13 is formed between the inner side wall 12*a* and the outer side wall 12. The groove 13 allows a separate lid (not shown) to cover the top of the compact disk labeling system 10.

The flat shelf 14 has a central opening 15 formed therein and has a plurality of slots 17 extending radially outward from the central opening 15 toward the inner side wall 12*a*. A hub 18 formed by a plurality of tabs that are portions of a circle extend away from the top surface of the flat shelf 14. The outer diameter of the hub 18 is sized to allow the central hole 20*a* in the CD label 20 to tightly slide over it so that the CD label 20 can rest on the flat shelf 14. The hub 18 thus registers the CD label 20. The central opening 15 and the plurality of slots 17 formed in the flat shelf 14 allow the hub 18 to flex downwardly toward the surface on which the labeling system 10 sits.

When the compact disk labeling system 10 is designed to work with mini CD 21*a* and a CD card 21*b*, certain changes are made to the system 10 shown in FIG. 1. The shape of the cavity 14 surrounded by the inner side wall 12*a* is designed to have a shape that matches that of the mini CD 21*a* or CD card 21*b*. Also, the CD label 20 has a smaller central hole 20*a* that that of the regular CD 20. Consequently the diameter of the hub 18 is smaller in the embodiment used with mini CDs 21*a* and CD cards 21*b*, otherwise, the function is the same.

Referring to FIG. 3, it shows a bottom view of the compact disk labeling system 10. A lower cavity 14*b* is formed between the inner edge of the outer side wall 12 and a lower surface of the flat shelf 14.

Figure 5:
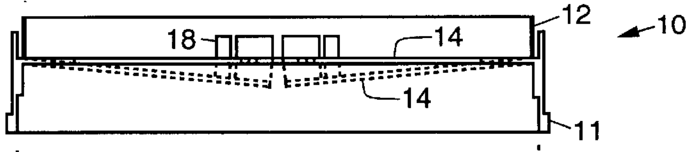
FIG. 5 illustrate operation of the compact disk labeling system.

In operation, a CD label 20 is placed over the hub 18 with its adhesive side 20*b* exposed so that it more-or-less rests on the flat surface, and is registered by the hub 18. The compact disk 21 is placed in the cavity so that it is registered by the inner side wall 12*a*. The compact disk 21 is then pressed downward toward the flat shelf 14 which depresses the plurality of tabs comprising the hub 18. This is illustrated in FIG. 5 for clarity. The compact disk 21 thus contacts the adhesive side of the CD label 20 and is fully depressed so that it contacts the outer portion of the flat shelf 14, which attaches the CD label 20 to the surface of the compact disk 21.

Figure 4:
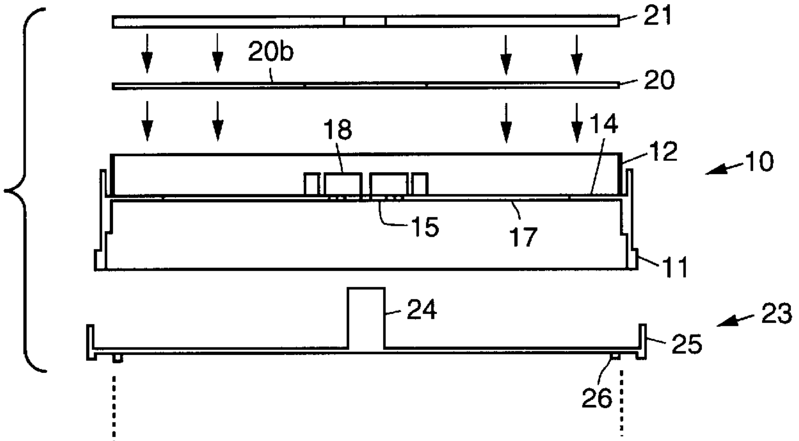
FIG. 4 is a cross-sectional side view of the compact disk labeling system shown in FIG. 1 along with a cover.

Referring now to FIG. 4, it shows a cross-sectional side view of the compact disk labeling system 10 shown in FIG. 1 along with a cover 23. The cover 23 is preferably a molded plastic component having a central spindle 24 extending therefrom and a side wall 25. The inner edge of the side wall 25 is sized so that it may slide over the lower edge 11 of the outer side wall 12 of the labeling system 10 and be held in place thereby. The spindle 24 and cover 23 thus may hold a plurality of compact disks 21 within the lower cavity 14*b* formed beneath the flat shelf 14. The lower surface of the cover 23 may also be configured with one or more features 26 that allow it to be stacked with additional labeling systems 10. Such features 26 may be a circular ridge or similar projection having a diameter that is sided to mate with the inner edge of the outer side wall 12. The dashed lines between FIG. 4 and FIG. 5 illustrate that the cover 23 may be stacked on top of another labeling system 10.

Figure 6:
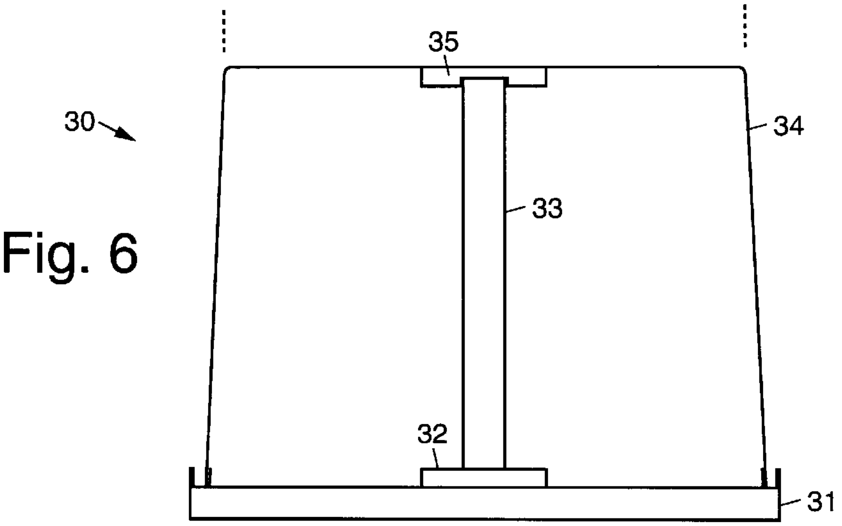
FIG. 6 illustrates a conventional compact disk carrier to which the present compact disk labeling system is designed to mate.

FIG. 6 illustrates a conventional compact disk carrier 30 to which the present compact disk labeling system 10 is designed to mate. The compact disk carrier 30 has a base 3 having a central hub 32 with a shaft 33 extending therefrom. The hub 32 prevents compact disks 21 housed therein from being scratched by the base 31. The shaft 33 has a diameter sized to fit the central opening 21*a* of the compact disk 21. An outer cover 34 having a central recess 35 designed to mated with the upper end of the shaft 33 mates with the base 31 to enclose the carrier 30.

The inner side wall 12*a* adjacent to the lower edge of the compact disk labeling system 10 is sized to slide over the top of the cover 34 of the carrier 30. The inner side wall 12*a* is sized to allow a tight fit between the compact disk labeling system 10 and the cover of the carrier 30. This allows the compact disk labeling system 10 to be conveniently packaged with the carrier 30. The dashed lines between FIG. 5 and FIG. 6 illustrate that the compact disk labeling system 10 is sized to slide over the top of the cover 34 of the carrier 30.

Thus, an improved compact disk labeling system for use in applying an adhesive label to a surface of a compact disk has been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A compact disk labeling system for use in applying an adhesive label to a compact disk comprising:

a side wall having a shape that substantially matches the exterior shape of the compact disk and which registers the compact disk;

a flat shelf formed a predetermined distance below an upper edge of the side wall that forms an upper cavity, and that has a central opening formed therein with a plurality of slots extending outward therefrom toward the side wall; and a hub comprising a plurality of tabs that extend away from a top surface of the flat shelf, which hub is sized to allow a central hole in the adhesive label to register thereto, and wherein the central opening and slots in the flat shelf allow the hub to flex.

2. The system recited in claim 1 further comprising a cover.

3. The system recited in claim 2 wherein the cover has a central spindle extending therefrom and a side wall, and wherein an inner edge of the side wall is sized to slide over a lower edge of the side wall of the labeling system and be held in place thereby.

4. The system recited in claim 3 wherein a lower surface of the cover is configured with one or more features 26 that allow it to be stacked with additional labeling systems.

5. The system recited in claim 1 wherein the compact disk comprises a mini compact disk.

6. The system recited in claim 1 wherein the compact disk comprises a compact disk card.

7. The system recited in claim 1 which is molded as a single-piece plastic component.

8. The system recited in claim 2 wherein the cover is molded as a single-piece plastic component.

9. The system recited in claim 1 wherein the hub is formed by a plurality of tabs that are portions of a circle extend away from the top surface of the flat shelf.

10. The system recited in claim 1 further comprising a lower cavity formed between the inner edge of the side wall and a lower surface of the flat shelf, and wherein the inner edge of the side wall is sized to mate with a compact disk carrier.

11. A compact disk labeling system for use in applying an adhesive label to a compact disk, comprising:

a side wall having a shape that substantially matches the exterior shape of the compact disk and which registers the compact disk;

a flat shelf formed a predetermined distance below an upper edge of the side wall that forms an upper cavity, and that has a central opening formed therein with a plurality of slots extending outward therefrom toward the side wall; and a hub comprising a plurality of tabs that extend away from a top surface of the flat shelf, which hub is sized to allow a central hole in the adhesive label to register thereto, and wherein the central opening and slots in the flat shelf allow the hub to flex;

and whereby the adhesive label is placed over the hub with its adhesive side exposed, the compact disk is placed in the cavity and is registered by the side wall, the compact disk is pressed toward the flat shelf which depresses the tabs of the hub so that the compact disk contacts the adhesive side of the adhesive label to attach the adhesive label the compact disk.

12. The system recited in claim 11 further comprising a cover.

13. The system recited in claim 12 wherein the cover has a central spindle extending therefrom and a side wall, and wherein an inner edge of the side wall is sized to slide over a lower edge of the side wall of the labeling system and be held in place thereby.

14. The system recited in claim 13 wherein a lower surface of the cover is configured with one or more features that allow it to be stacked with additional labeling systems.

15. The system recited in claim 12 wherein the compact disk comprises a mini compact disk.

16. The system recited in claim 11 wherein the compact disk comprises a compact disk card.

17. The system recited in claim 11 which is molded as a single-piece plastic component.

18. The system recited in claim 12 wherein the cover is molded as a single-piece plastic component.

19. The system recited in claim 11 wherein the hub is formed by a plurality of tabs that are portions of a circle extend away from the top surface of the flat shelf.

20. The system recited in claim 11 further comprising a lower cavity formed between the inner edge of the side wall and a lower surface of the flat shelf, and wherein the inner edge of the side wall is sized to mate with a compact disk carrier.

21. In a compact disk labeling system for use in applying an adhesive label to a compact disk, apparatus for releasably holding the adhesive label, comprising:

a substantially flat surface having a plurality of slots formed therein; and a hub comprising a plurality of tabs that extend away from the flat surface on which the adhesive label is disposed, which hub is sized to allow a central hole in the adhesive label to register thereto, and wherein the plurality of slots in the flat shelf allow the hub to flex away from the non-adhesive surface of the adhesive label in a direction opposite to the direction that the tabs extend to allow application of the label to the compact disk.

22. The apparatus recited in claim 21 which comprises a molded single-piece plastic component.

23. The apparatus recited in claim 21 wherein the hub comprises a plurality of tabs that are portions of a circle that extend away from the flat surface.

* * * * *